US007315989B2

(12) United States Patent
Medvedev et al.

(10) Patent No.: US 7,315,989 B2
(45) Date of Patent: Jan. 1, 2008

(54) METHOD, COMPUTER PROGRAM PRODUCT, AND SYSTEM FOR A STATISTICAL ANALYSIS SCREENSAVER

(75) Inventors: Alexander Medvedev, Austin, TX (US); Rashmi Narasimhan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 11/006,123

(22) Filed: Dec. 7, 2004

(65) Prior Publication Data

US 2006/0123385 A1 Jun. 8, 2006

(51) Int. Cl.
*G06F 3/048* (2006.01)

(52) U.S. Cl. ........................ 715/867; 713/320; 713/323

(58) Field of Classification Search ................. 715/867
See application file for complete search history.

(56) References Cited

U.S. PATENT DOCUMENTS 6,384,852 B1 5/2002 Ye et al. ..................... 345/867
6,516,421 B1 2/2003 Peters ........................ 713/502
6,816,977 B2 * 11/2004 Brakmo et al. ............. 713/323
7,120,806 B1 * 10/2006 Codilian et al. ............ 713/320

OTHER PUBLICATIONS

IBM Research Disclosure n447, Jul. 2001, Article 166, p. 1255, “LCD Power Saving by Low Refresh Rate Drive of Liquid Crystal at Screen Saver Mode”.

IBM Technical Disclosure Bulletin v36 n11, Nov. 1993, pp. 233-234, “Display Power Management by Supply Rail Analysis”.

U.S. Appl. No. 10/936,128, Inui et al., Automatic Selection of Screen Saver Depending on Environmental Factors, filed Sep. 8, 2004.

* cited by examiner

*Primary Examiner*—Weilun Lo
*Assistant Examiner*—Kim-Lynn Dam
(74) *Attorney, Agent, or Firm*—Duke W. Yee; Marilyn S. Dawkins; Steven McDonald

(57) ABSTRACT

A method, computer program product, and a data processing system for activating a screensaver in a data processing system is provided. A timeout value that defines an idle interval after which a screensaver is to be activated is set. An analysis of contents of a video memory is performed. The timeout value is adjusted responsive to the analysis.

17 Claims, 2 Drawing Sheets

METHOD, COMPUTER PROGRAM PRODUCT, AND SYSTEM FOR A STATISTICAL ANALYSIS SCREENSAVER

BACKGROUND OF THE INVENTION

1. Technical Field

The present invention relates generally to an improved data processing system and in particular to a data processing system and method for an improved screen saver. Still more particularly, the present invention provides a mechanism for performing statistical analysis of screen pixels for varying the wait period for activating a screen saver.

2. Description of Related Art

Screensavers are applications that display a black image or a changing image to prevent an image from “burning” pixels of a display screen, such as a cathode ray tube (CRT) display. Pixel burn-in on CRT displays results from the screen phosphor fatiguing such that the phosphor appears faded. Screensavers typically activate automatically after a predefined idle, or wait, period during which no user activity is supplied to the computer.

It is well known that bright colors, such as white, cause pixel burnout faster than other less intense colors. It is additionally well known that screensavers consume substantial CPU power. Conventional screensavers, however, have predefined wait periods of inactivity after which activation of the screensaver results. Although a wait period may be adjusted by the user, a single wait period interval is used for activating the screensaver at any given time regardless of what is being displayed on a display screen.

It would be advantageous to provide a mechanism for dynamically varying a wait period after which a screensaver is activated in a data processing system. It would be further advantageous to provide a mechanism for dynamically varying a screensaver wait period dependent on the screen pixel colors being displayed prior to activation of the screensaver.

SUMMARY OF THE INVENTION

The present invention provides a method, computer program product, and a data processing system for activating a screensaver in a data processing system. A timeout value that defines an idle interval after which a screensaver is to be activated is set. An analysis of contents of a video memory is performed. The timeout value is adjusted responsive to the analysis.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
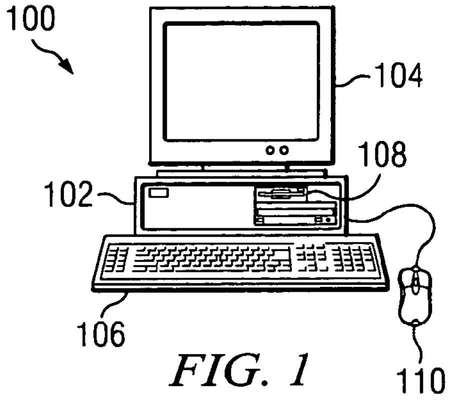
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, such as a cathode ray tube (CRT) display device, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
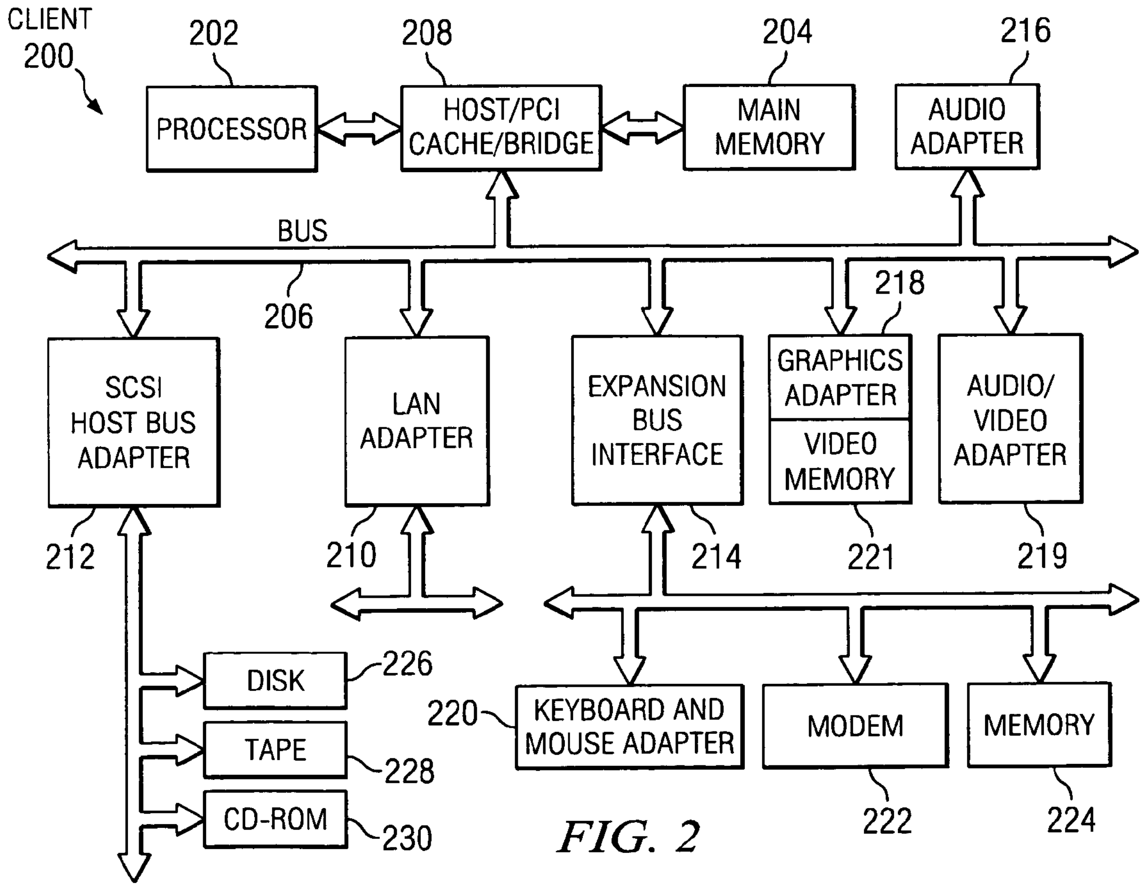
FIG. 2 is a block diagram of a data processing system in which a preferred embodiment of the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Graphics adapter 218 may include video memory 221, such as one or more video RAM (VRAM) modules, and provides an interface for coupling data processing system 200 with a display device, such as video display terminal 104 shown in FIG. 1. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention improves screensaver performance by dynamically varying the inactivity wait period after which a screensaver is activated. In accordance with a preferred embodiment, a white coefficient is calculated and a timeout value is calculated as a function of the white coefficient. As referred to herein, a white coefficient is a numerical measure of the collective amount (or, alternatively, a predefined subset) of white pixels output on a display device. The white coefficient may be calculated, for example, by reading an active frame from video memory, such as video memory 221 shown in FIG. 2, and deriving a measure of the number of white pixels in a currently displayed screen image. A timeout value is then adjusted based on the white coefficient. For example, a screen display image that comprises a fully white image would result in a large white coefficient being calculated and a corresponding reduction in the timeout value for waiting to activate a screensaver. On the other hand, a screen image being displayed that comprises a small white coefficient, for example an image comprises a majority of black, or inactive, pixels may result in the timeout value being increased thereby delaying activation of the screensaver.

Figure 3:
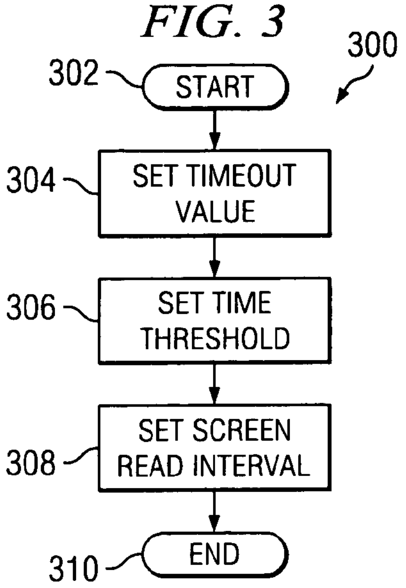
FIG. 3 is a flowchart depicting an initialization routine for initializing screensaver settings that facilitate dynamic modification of a screensaver wait period in accordance with a preferred embodiment of the present invention.

FIG. 3 is a flowchart depicting an initialization routine for initializing screensaver settings that facilitate dynamic modification of a screensaver wait period in accordance with a preferred embodiment of the present invention. The screen saver initialization routine is preferably implemented as a module of a screen saver application program. The screen saver initialization routine 300 begins (step 302), for example, on invocation of a screensaver initialization module and a timeout value is set (step 304). The timeout value defines an inactivity interval after which an absence of user activity or input results in activation of the screensaver. A default timeout value may be coded into the screensaver or a timeout value may be supplied by a user. A time threshold is then set (step 306). The time threshold defines a maximum adjustment interval that the timeout value may be increased or decreased. The time threshold may be predefined and coded into the screensaver or may alternatively be supplied by a user. Additionally, a screen read interval may be set (step 308) that defines the frequency or interval at which a white coefficient is calculated (step 308), and thereafter the initialization routine exits (step 310).

Figure 4:
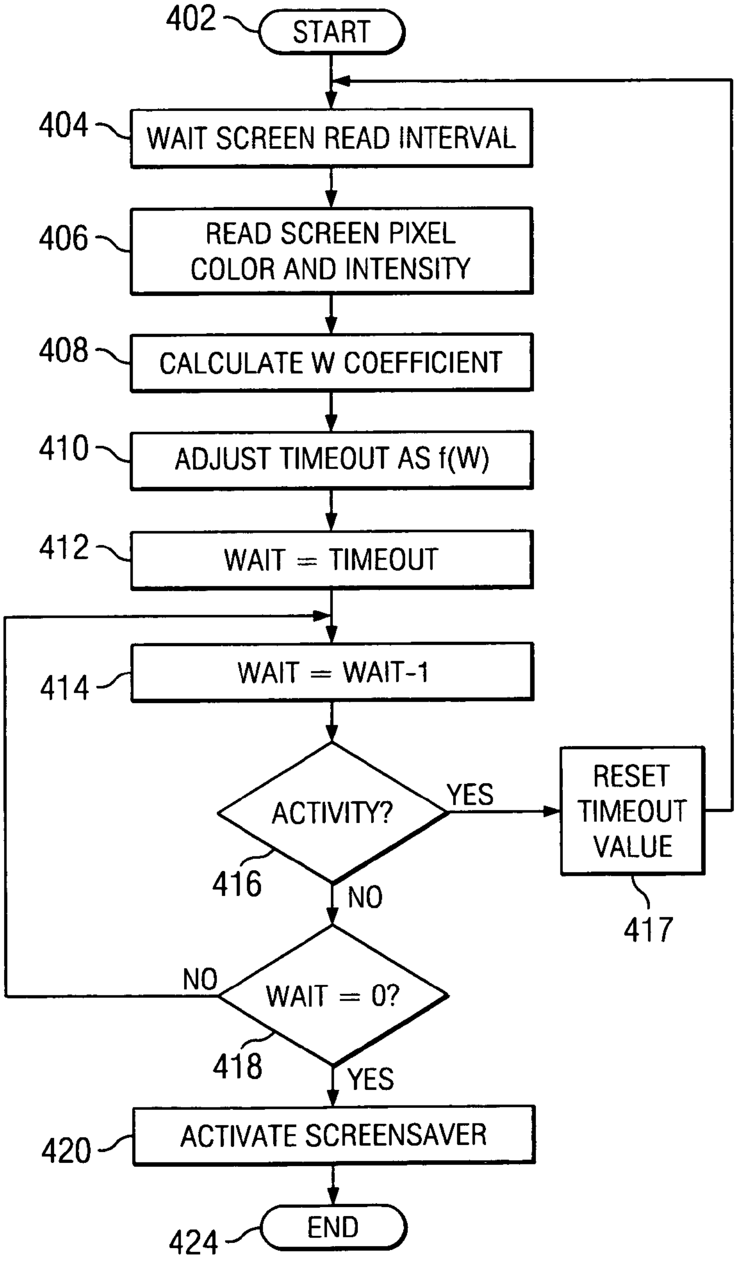
FIG. 4 is flowchart of a screensaver routine featuring dynamic variations in activation wait periods in accordance with a preferred embodiment of the present invention.

With reference now to FIG. 4, a flowchart of a screensaver routine featuring dynamic variations in activation wait periods is shown in accordance with a preferred embodiment of the present invention. The screensaver routine depicted in FIG. 4 is preferably implemented as an application program and may include the initialization routine described above in FIG. 3, for example as an application subroutine or module. The screensaver routine begins (step 402), for example on a batch load at system boot or invocation by a user or background process running on a data processing system. The screensaver routine then waits the screen read interval (step 404) and thereafter reads screen pixel color and intensity values (step 406). For example, each pixel value, or a subset thereof, are read from an active frame of video memory that defines a current image being displayed. A white (W) coefficient is then calculated (step 408) based on the screen pixel values read at step 406 as discussed more fully hereinbelow. The timeout value is then adjusted as a function of the calculated W coefficient (step 410).

The screensaver routine then sets the wait period to the adjusted timeout value (step 412). The screensaver routine then begins to decrement the timeout value (step 414) and check for activity (step 416). In the event that activity is detected, that is an input is detected as being provided to the data processing system or another activity that results in a change to the image output on the display device, the screensaver routine resets the timeout value (step 417) and returns to wait another screen read interval according to step 404. If no activity is detected at step 416, an evaluation is made to determine if the wait period has expired (step 418). If the wait period has not expired, the screensaver routine returns to decrement the timeout value according to step 414. If, however, it is determined that the wait period has expired at step 418, the screensaver is activated (step 420), and the screensaver routine cycle ends (step 424).

In accordance with a preferred embodiment of the present invention, the W coefficient calculated at step 408 is calculated as a quotient of the sum of the white pixel count and weighted base colors, such as blue, green, and red, and the total pixel count. For example, equation 1 is an exemplary formulation for calculating a W coefficient:

eq. 1:

$$W = \frac{N_W * 1 + \frac{N_b}{3} + \frac{N_g}{3} + \frac{N_r}{3} + N_{black} * 0}{N_t}$$

where: $N_b$=number of blue pixels, $N_g$=Number of green pixels, $N_r$=Number of red pixels, $N_{black}$=Number of black pixels, and $N_t$=total number of pixels Thus, the W coefficient is calculated by reading each pixel value (or a subset thereof) of a current frame in video memory that is being displayed and accumulating a corresponding pixel color counter, e.g., pixel color counters Nb, Ng, Nr, or Nblack, and the total number of pixels Nt that are read. As can be seen, the number of black pixels Nblack is zero weighted due to black pixels having no contribution to the brightness of a displayed image.

In accordance with a preferred embodiment of the present invention, a particular value of the W coefficient may be predefined as an adjustment threshold. For example, an average W value, i.e., 0.5, may be predefined as an adjustment threshold, with W values above 0.5 resulting in a reduction of the wait period, and W values below 0.5 resulting in an increase in the wait period. An exemplary formulation for adjusting the timeout value as a function of the calculated W value is provided in equation 2 as follows:

timeout_value=timeout_value+time_threshold*2*(0.5−W) eq. 2

Thus, as the W coefficient increases above 0.5, a corresponding decrease in the idle period for activating the screensaver in the absence of activity is realized. Conversely, as the W coefficient decreases below 0.5, a corresponding increase in the idle period required for activating the screensaver in the absence of activity is realized.

As an illustrative example, assume a timeout value of 30 minutes is predefined in the screensaver routine or supplied by a user. Additionally, assume a time threshold of 12 minutes is predefined in the screensaver routine or is supplied by the user. Thus, a wait period of 30 minutes may be adjusted by a maximum increase and decrease of 12 minutes. That is, the wait period has a range of 18 minutes to 42 minutes—the particular wait period that is realized dependent on the W coefficient calculated from the active video memory frame.

Consider an example frame in video memory that has a white pixel composition of half the pixels, and the remaining half of the pixels evaluated as red, green and blue. The W coefficient calculated for such a frame is 0.667. The timeout value is then calculated as the default timeout value of 30 minutes minus an adjustment of 4 minutes—resulting in an adjusted timeout value of 26 minutes. Next, consider a frame in video memory that has a relatively small white pixel composition of ten percent of the total pixels with the remaining pixels comprised of red, green, and blue pixels. The W coefficient calculated for such a frame is 0.4. The timeout value is then calculated as the default timeout value of 30 minutes plus an adjustment of 2.4 minutes—resulting in an adjusted timeout value of 32.4 minutes.

Thus, an active frame in video memory that has a relatively large white pixel composition results in an decrease in the wait period, and a relatively small white pixel composition results in an increase in the wait period. Accordingly, a screensaver is activated earlier when a displayed image has a large white pixel composition thereby extending the life of screen pixels. When a screen is displaying an image with a relatively small amount of white pixels, activation of the screensaver is delayed thereby allowing more CPU capacity for background applications.

As described, the present invention provides a mechanism for dynamically varying a wait period after which a screensaver is activated in a data processing system. The screensaver of the present invention dynamically varies a wait period after which a screensaver is activated. The screensaver wait period is dependent on pixel colors being displayed prior to activation of the screensaver.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of activating a screensaver in a data processing system, comprising:

setting a timeout value that defines an idle interval after which a screensaver is to be activated;

performing an analysis of contents of a video memory, wherein performing an analysis comprises:

calculating a measure of white pixel composition of a video display image; and responsive to performing the analysis, adjusting the timeout value.

2. The method of claim 1, wherein adjusting the timeout value further comprises: increasing the timeout value when the measure is less than a threshold.

3. The method of claim 1, wherein adjusting the timeout value further comprises: decreasing the timeout value when the measure is greater than a threshold.

4. The method of claim 1, further comprising:

setting an adjustment value, wherein the adjustment value defines a maximum adjustment with which the timeout value may be increased or decreased.

5. The method of claim 1, wherein performing an analysis further comprises:

calculating a number of white pixels of an image that is displayed on a video display terminal.

6. The method of claim 5, wherein an adjustment to the timeout value is inversely proportional to the number of white pixels.

7. The method of claim 1, wherein the timeout value is set by a user.

8. A computer program product in a recordable-type computer readable medium for activating a screensaver in a data processing system, the computer program product comprising:

first instructions that set a timeout value that defines an idle interval after which a screensaver is to be activated;

second instructions that perform an analysis of contents of a video memory, wherein performing an analysis comprises:

calculating a measure of white pixel composition of a video display image; and third instructions that, responsive to the second instructions performing the analysis, adjust the timeout value.

9. The computer program product of claim 8, wherein the third instructions increase the timeout value when the measure is less than a threshold.

10. The computer program product of claim 8, wherein the third instructions decrease the timeout value when the measure is greater than a threshold.

11. The computer program product of claim 8, further comprising:

fourth instructions that set an adjustment value, wherein the adjustment value defines a maximum adjustment with which the timeout value may be increased or decreased.

12. The computer program product of claim 8, wherein the second instructions calculate a number of white pixels of an image that is displayed on a video display terminal.

13. The computer program product of claim 12, wherein an adjustment to the timeout value is inversely proportional to the number of white pixels.

14. The computer program product of claim 8, wherein the timeout value is set by a user.

15. A data processing system adapted to activate a screensaver, comprising:

a memory that contains a screensaver as a set of instructions;

a video display terminal;

a video memory that stores an image frame displayed on the video display terminal; and a processing unit, responsive to execution of the set of instructions, that sets a timeout value that defines an idle interval after which a screensaver is to be activated and that performs an analysis of the image frame, wherein performing an analysis comprises calculating a measure of white pixel composition of a video display image; and wherein the processing unit adjusts the timeout value responsive to analyzing the image frame.

16. The data processing system of claim 15, further comprising:

a graphics adapter coupled with the processing unit, wherein the video memory is disposed on the graphics adapter.

17. The data processing system of claim 15, wherein the processing unit sets an adjustment value that defines a maximum adjustment with which the timeout value may be adjusted responsive to the analysis.

* * * * *